United States Statutory Invention Registration [19]

[11] Reg. Number: H751

Sullivan et al. [43] Published: Mar. 6, 1990

[54] METHOD OF INHIBITING ACID CORROSION OF FERROUS METALS

[76] Inventors: Daniel S. Sullivan, 9114 Tooley Dr., Houston, Tex. 77031; Stanley J. Brois, 773 Lambert Mill Rd., Westfield, N.J.; Robert C. Portnoy, 7803 Westmont Ct., Houston, Tex. 77071

[21] Appl. No.: 204,839

[22] Filed: Jun. 10, 1988

[51] Int. Cl.[4] ..... E21B 43/27

[52] U.S. Cl. ..... 252/8.553; 546/347; 252/8.553; 252/148; 422/12

[58] Field of Search ..... 422/12; 252/148, 8.555, 252/8.553; 546/347

[56] References Cited

U.S. PATENT DOCUMENTS

| | | | |
|---|---|---|---|
| 2,037,762 | 4/1936 | Cole | 546/347 X |
| 2,814,593 | 11/1957 | Beiswanger et al. | 252/8.555 |
| 4,071,746 | 1/1978 | Quinlan | 422/12 |
| 4,498,997 | 2/1985 | Walker | 252/8.553 |
| 4,552,672 | 11/1985 | Walker | 252/8.553 |
| 4,698,168 | 10/1987 | Briggs | 252/8.553 |

*Primary Examiner*—Howard J. Locker
*Assistant Examiner*—John Covert

[57] ABSTRACT

A method for inhibiting acid corrosion of metal well equipment which comprises introducing into an aqueous acid solution an inhibiting amount of a quaternary compound prepared by reacting a tertiary aromatic heterocyclic amine with a (halo-substituted-aryl) alkyl halide, and contacting the well equipment with the inhibited aqueous acid solution.

21 Claims, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

METHOD OF INHIBITING ACID CORROSION OF FERROUS METALS

FIELD OF THE INVENTION

This invention relates generally to acid corrosion inhibitors and in particular to corrosion inhibitors useful in oil field treating operations. In one aspect the invention relates to a method of using a substituted quaternary compound as an acid corrosion inhibitor. In another aspect the invention relates to the use of an aqueous acid solution containing a substituted quaternary compound.

BACKGROUND OF THE INVENTION

In the acid treatment of subterranean formations penetrated by a wellbore, an aqueous acid solution is injected down the well into the formation to dissolve formation materials and/or other materials deposited in the wellbore thereby improving permeability of the formation and its production. The acid treatment may be carried out under matrix injection rates or fracturing rates.

A serious problem associated with acidizing formations is the high corrosivity of the acid solution on surface and subsurface metal equipment. The acid, normally HCl or mud acid (HCl-HF mixture), is highly corrosive to ferrous metals. Accordingly, the acid treatment almost always involves the use of corrosion inhibitors.

Corrosion inhibitors used in the past in acid treatment of wells include various acetylenic alcohols, fluorinated surfactants, quaternary derivatives of heterocyclic nitrogen bases and halomethylated aromatic compounds, formamides and surface active agents, alone or in combination with other materials. Examples of these prior art corrosion inhibitors are disclosed in U.S. Pat. Nos. 3,658,720 and 4,028,268.

SUMMARY OF THE INVENTION

The method of the present invention involves the steps of contacting a ferrous metal, which is susceptible to acid corrosion, with an effective amount of a corrosion inhibitor comprising a quaternary compound prepared by reacting a tertiary aromatic heterocyclic amine with a (halo-substituted-aryl) alkyl halide wherein the alkyl group contains from 1 to 3 carbon atoms and the halogen substitution of the (halo-substituted-aryl) group is on the aromatic ring. The preferred halides include halobenzyl halides and (halo-substituted-phenyl) alkyl halides.

The preferred method of practicing the present invention is to prepare a corrosion inhibitor formulation package including the corrosion inhibitor quaternary compound with or without other compounds and inhibitors, and to subsequently use this corrosion inhibitor formulation package to prepare an inhibited acid solution in one step.

The corrosion inhibitor preferably has the following formula:

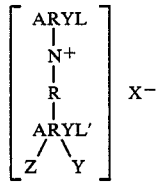

wherein ARYL is a heterocyclic aromatic ring or rings; N+ is a positively charged nitrogen atom and is part of ARYL; ARYL is an aromatic ring or rings; R is an alkyl group containing from 1 to 3 carbon atoms and connects N+ to ARYL'; X is a halogen; Y is a halogen substituted on ARYL'; and Z is hydrogen or a halogen substituted on ARYL'.

DESCRIPTION OF THE PREFERRED EMBODIMENTS

The preferred method for carrying out the present invention involves incorporating a small but effective amount of the quaternary corrosion inhibitor in an aqueous acid solution for treatment of subterranean formations. The aqueous acid solution includes solutions of hydrochloric acid (HCl), mud acid (a mixture of hydrochloric acid and hydrofluoric acid), acetic acid and formic acid. Although sulfuric acid is not normally used in the petroleum industry, it is used in pickling operations and therefore is included herein. All of these acids are highly corrosive to ferrous metals and therefore require inhibition. The concentration of the corrosion inhibitor should be sufficiently high to inhibit corrosion of the ferrous metals and normally will range from 0.01 to 10 percent (preferably 0.05 to 3.0 %) by volume based on the combined volume of the inhibitor and acid solution. The inhibitor concentration in a particular treatment will depend on several factors including acid type and concentration, temperature, exposure time, and the presence of other additives. It is important that the inhibitor be added to the acid as early as possible to protect storage, pumping and handling equipment, as well as tubular goods in the well.

The quaternary compound, as mentioned above, is the reaction product of a tertiary aromatic heterocyclic amine and a (halo substituted aryl) alkyl halide, having the following formula.

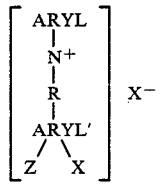

wherein ARYL is a heterocyclic aromatic ring or rings; N+ is a positively charged nitrogen atom and is part of AHYL; ARYL' is an aromatic ring or rings; and R is an alkyl group containing from 1 to 3 carbon atoms and connects N+ to ARYL'; X is a halogen; Y is a halogen substituted on ARYL'; and Z is a halogen or hydrogen substituted on ARYL'.

The preferred quaternary compound is selected from the group consisting of:

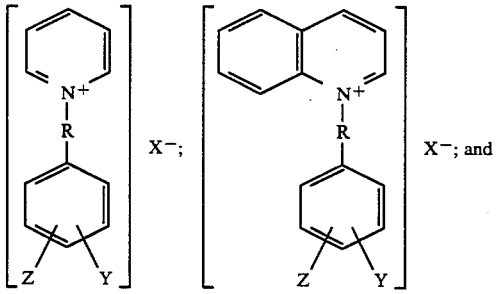

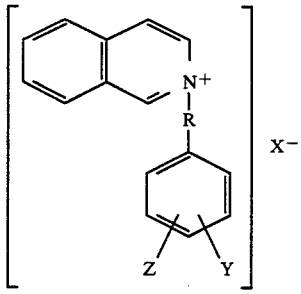

wherein R is an alkyl group containing from 1 to 3 carbon atoms; X and Y are halogens; and Z is a halogen or hydrogen.

The preferred tertiary aromatic heterocyclic amines include quinoline, quinaldine, isoquinoline, pyridine, acridine, phenanthridine, and mixtures and substitutions of these. Certain industrially available mixtures of amines are particularly suited for this role including coal tar bases, which contain mixtures of quinoline, isoquinoline, substituted quinolines and isoquinolines, quinaldine and other unreactive materials such as indole. Industrially available mixtures of alkyl pyridines are also quite suitable for this role.

The preferred (halo-substituted-aryl) alkyl halides are (halobenzyl) halides or halo substituted halomethyl naphthalenes having the following formulas:

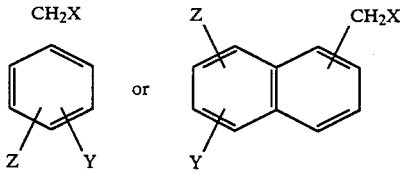

where X and Y are halogens and Z is hydrogen H, or a halogen.

Chlorine is the most preferred halogen substituent. In the embodiment which employs di halogen substitution on the aromatic ring, it is preferred that Z be the same as Y.

The preferred (halo-substituted-aryl) alkyl halides are the (halo substituted) or (dihalo substituted) benzyl halides. Specific benzyl halides useable include chlorobenzyl chloride, fluorobenzyl chloride, bromobenzyl chloride, iodobenzyl chloride and the various isomeric dichlorobenzyl chlorides (also known as trichlorotoluene, in which of the chlorine atoms are on the aromatic ring and one of the chlorine atoms is on the methylene carbon), with the halobenzyl chlorides being preferred, in particular, the chlorobenzyl chlorides. The chlorobenzyl chlorides are relatively low in cost and exhibit excellent inhibition properties.

In preparing the corrosion inhibitor, the tertiary aromatic amine compound is reacted with the (halo-substituted-aryl) alkyl halide in proper stoichiometric proportions and at the reaction conditions to achieve substantial formation of the quaternary compound wherein the halogen on the aromatic ring of the (halo-substituted-aryl) alkyl halide does not enter into the reaction and remains intact on the aromatic ring. It is believed that the presence of this halogen contributes to the corrosion inhibition properties of the quaternary compound. While not fully understood, it is believed that the presence of the halogen on the aromatic ring exerts an electron withdrawing influence on the aromatic ring and therefore contributes to formation of a more dense packing of molecules on the metal surface. This dense packing results in improved protection from the acid. The degree of protection is particularly surprising in view of the relatively small size the ring halogen atom in comparison to the quaternary compound. The corrosion inhibitor prepared from the preferred (halo substituted) benzyl chlorides offer advantages over several corrosion inhibitors because they can be prepared from readily available starting materials.

The reaction of a tertiary heterocyclic amine with a halobenzyl halide may be described as follows. The selected tertiary heterocyclic amine and the selected halobenzyl halide are charged to a reactor on an equal mole to mole basis. A small amount of solvent (e.g. 10% of charge) is then added to the reactor. The reaction mixture is heated with agitation and the temperature is elevated to between about 120° to 140° C. The reaction is continued for three to seven hours depending on the specific reactants selected. At the end of the reaction, additional solvent may be added to produce a solution of a quaternary compound in liquid form. Sixty percent (60%) in isopropanol has been found to be a convenient concentration.

The corrosion inhibitor, dissolved or dispersed in the solvent may be introduced into the aqueous acid at a concentration to provide protection of ferrous metals against acid corrosion.

Other additives which may be included in the aqueous acid package are acetylenic alcohol, surfactants, hydrocarbons, formic acid derivatives (e.g. formamide), other quaternary compounds, etc. In addition, other additives for well stimulation and workover treatments may be included in the package. These include compounds such as mutual solvents (e.g. ethylene glycol monobutyl ether) and complex surfactant formulations designed to prevent formation of emulsions. These additives as well as many others are routinely used in acid corrosion formulation packages.

The preferred corrosion inhibitor additive components for introduction into an aqueous acid include the following:

| | Broad Range (Vol % of Acid Soln.) | Preferred Range (Vol % of Acid Soln.) |
|---|---|---|
| Corrosion inhibitor of the present invention | 0.01–4.0 | 0.1–2.0 |
| Acetylenic Alcohols | 0–4.0 | 0.1–2.0 |
| Hydrocarbon liquid | 0–1.0 | 0–0.5 |
| Surfactant | 0–1.0 | 0–0.5 |
| Formamide or formic acid | 0–20.0 | 0–10.0 |

The purpose of these additives are as follows:

acetylenic alcohols: improves effect of quaternary compound surfactant: water soluble; dispersant; contributes to pitting control to reduce corrosion rates formamide or formic acid: inhibitor intensifier hydrocarbon liquid: oil wet metal surface (e.g. heavy aromatic naphtha, pine oil, mineral oil and $C_{14}$–$C_{20}$ fatty acids such as tall oil fatty acid.

The corrosion inhibitor may be used alone but preferably is used in a package (containing one or more of the the above additives), which is especially formulated for optimum performance. The entire package may be added to the acid solution. The preferred corrosion inhibitor packages are as follows:

| | Broad Range (wt % of Package) | Preferred Range (wt % of Package) |
|---|---|---|
| Corrosion inhibitor of the present invention | 2–100 | 5–50 |
| Acetylenic Alcohols | 0–80 | 5–25 |
| Hydrocarbon liquid | 0–30 | 5–20 |
| Surfactant | 0–20 | 1–10 |
| Formamide or formic acid | 0–90 | 10–50 |

In connection with well treating operations, the corrosion inhibitor package may be added to the acid solution and transported to the well site. The aqueous acid solution with the corrosion inhibitor package may then be pumped into the well using conventional techniques and equipment.

EXPERIMENTS

The samples of the corrosion inhibitors listed in Table I were prepared in isopropyl alcohol by the method described above.

TABLE I

| | Quaternary Compounds | |
|---|---|---|
| SAMPLE NO. | HETEROCYCLIC AMINE | QUATERNIZATION AGENT |
| 1 | Coal Tar Bases | Benzyl Chloride |
| 2 | Coal Tar Bases | 2-Chlorobenzyl Chloride |
| 3 | Coal Tar Bases | 3-Chlorobenzyl Chloride |
| 4 | Coal Tar Bases | 4-Chlorobenzyl Chloride |
| 5 | Coal Tar Bases | 2-Fluorobenzyl Chloride |
| 6 | Coal Tar Bases | 3-Fluorobenzyl Chloride |
| 7 | Coal Tar Bases | 4-Fluorobenzyl Chloride |
| 8 | Coal Tar Bases | 2-Bromobenzyl Bromide |
| 9 | Coal Tar Bases | 3-Bromobenzyl Bromide |
| 10 | Coal Tar Bases | 4-Bromobenzyl Bromide |
| 11 | Coal Tar Bases | a-2,6-Trichlorotoluene |

TABLE I-continued

| | Quaternary Compounds | |
|---|---|---|
| SAMPLE NO. | HETEROCYCLIC AMINE | QUATERNIZATION AGENT |
| 12 | Coal Tar Bases | a-2,4-Trichlorotoluene |
| 13 | Coal Tar Bases | a-3,4-Trichlorotoluene |
| 14 | Isoquinoline | 2-Chlorobenzyl Chloride |
| 15 | Quinaldine | 2-Chlorobenzyl Chloride |
| 16 | Quinoline | 2-Chlorobenzyl Chloride |
| 17 | 2,3-Cyclohexenopyridine | 2-Chlorobenzyl Chloride |
| 18 | 2,3-Cyclohexenopyridine | Benzyl Chloride |
| 19 | 6-Methylquinoline | 2-Chlorobenzyl Chloride |
| 20 | 4-Methylquinoline | 2-Chlorobenzyl Chloride |
| 21 | Acridine | 2-Chlorobenzyl Chloride |
| 22 | Phenanthridine | 2-Chlorobenzyl Chloride |
| 23 | Coal Tar Bases | 2-Iodobenzyl Chloride |
| 24 | Coal Tar Bases | Chloromethyl Chloronaphthalene |
| 25 | 4-Chloroquinoline | 2-Chlorobenzyl Chloride |
| 26 | 4-Ethylpyridine | 2-Chlorobenzyl Chloride |
| 27 | 4-Ethylpyridine | Benzyl Chloride |

Note that Samples 1; 18, and 27 represent prior art corrosion inhibitors.

Samples 1 through 27 were prepared as a 60% concentrated solution in isopropyl alcohol and tested in an acid corrosion testing autoclave. Certain test samples included corrosion inhibitor and additives and other test samples included only the corrosion inhibitor. The corrosion inhibitor sample and other additives, if used, were added to a 15% HCl acid solution at a concentration as indicated in Table II based on the total weight of the final solution. The additive, identified as Formula A, had the following composition

| | wt % |
|---|---|
| Formula A | |
| Acetylenic Alcohol | 14.6 |
| Surfactant | 7.4 |
| Hydrocarbon Liquid | 19.4 |
| Formamide | 39.6 |
| Solvent (alcohol) | 19.0 |
| TOTAL | 100.0 |

Metal coupons made from schedule N80 steel tubing were exposed to the inhibited acid mixture. After the test exposure, the coupons were cleaned, dried, weighed and visually evaluated for corrosion effects. The corrosion rate (in pounds of steel lost per square foot of area) was calculated from the weight loss data.

The HCl solution with additives thus prepared were tested under various test conditions at various treating rates as shown in Table II.

TABLE II

| | | | | | TEST CONDITIONS | | |
|---|---|---|---|---|---|---|---|
| TESTS | SAMPLE wt % | ADDITIVE | ADDITIVE wt % | ACID | TEMP. °F. | PRESS. Psig | TIME Hrs. |
| Series | | | | | | | |
| A | 0.9 | Formula A | 2.1 | 15% HCl | 325 | 4000 | 6 |
| B | 0.9 | Formula A | 2.1 | 15% HCl | 300 | 4000 | 6 |
| Series | | | | | | | |
| C | 1.0 | — | — | 15% HCl | 180 | atm | 6 |
| D | 2.0 | — | — | 15% HCl | 300 | 4000 | 4 |
| E | 2.0 | Formic acid | 2.0 | 15% HCl | 300 | 4000 | 4 |
| F | 2.0 | Surfactant[1] | 1.0 | 15% HCl | 300 | 4000 | 4 |
| G | 2.0 | PA[2] | 2.0 | 15% HCl | 300 | 4000 | 4 |
| H | 2.0 | KI | 1.0[3] | 15% HCl | 300 | 4000 | 4 |

TABLE II-continued

| TESTS | SAMPLE wt % | ADDITIVE | ADDITIVE wt % | ACID | TEST CONDITIONS TEMP. °F. | PRESS. Psig | TIME Hrs. |
|---|---|---|---|---|---|---|---|
| I | 2.0 | $Cu_2I_2$ | 1.03 | 15% HCl | 300 | 4000 | 4 |

[1]ethoxylated nonyl phenol (10 moles EO)
[2]Propargyl alcohol
[3]1 gram/100 ml

The corrosion coupon test data are presented in Tables III through XI.

TABLE III

| Series A | |
|---|---|
| SAMPLE NO. | CORROSION RATE (LB/SQ FT) |
| 1* | .2896 |
| 2 | .1577 |
| 3 | .1822 |
| 4 | .2167 |
| 5 | .2858 |
| 6 | .2168 |
| 7 | .3298 |
| 8 | .2840 |
| 9 | .2803 |
| 10 | .2126 |
| 11 | .1480 |
| 12 | .2095 |
| 13 | .1939 |

*Prior art corrosion inhibitor

TABLE IV

| Series B | |
|---|---|
| SAMPLE NO. | CORROSION RATE (LB/SQ FT) |
| 1* | .0798 |
| 2 | .0349 |
| 3 | .0572 |
| 4 | .0440 |
| 5 | .0552 |
| 6 | .0378 |
| 7 | .0806 |
| 10 | .0381 |

*Prior art corrosion inhibitor

TABLE V

| Series C | |
|---|---|
| SAMPLE NO. | CORROSION RATE (LB/SQ FT) |
| 1* | .0935 |
| 2 | .0559 |
| 3 | .0143 |
| 4 | .0192 |
| 5 | .1106 |
| 6 | .0690 |
| 7 | .0659 |
| 8 | .1281 |
| 9 | .1146 |
| 10 | .0788 |
| 11 | .1081 |
| 13 | .0150 |
| 14 | .2550 |
| 15 | .0951 |
| 16 | .0192 |
| 17 | .3077 |
| 18* | .3648 |
| 19 | .0168 |
| 20 | .0645 |
| 21 | .5980 |
| 22 | .0575 |
| 23 | .0583 |
| 24 | .0657 |

TABLE V-continued

| Series C | |
|---|---|
| SAMPLE NO. | CORROSION RATE (LB/SQ FT) |
| 25 | .3731 |
| 26 | .2933 |
| 27* | .4038 |
| 28 | .3648 |

*Prior art corrosion inhibitor

TABLE VI

| Series D | |
|---|---|
| SAMPLE NO. | CORROSION RATE (LB/SQ FT) |
| 1* | .3261 |
| 2 | .2139 |
| 3 | .1696 |
| 4 | .1530 |
| 5 | .3801 |
| 6 | .3689 |
| 7 | .3839 |
| 8 | .4425 |
| 9 | .3492 |
| 10 | .3716 |
| 11 | .2731 |
| 13 | .2603 |

*Prior art corrosion inhibitor

TABLE VII

| Series E | |
|---|---|
| SAMPLE NO. | CORROSION RATE (LB/SQ FT) |
| 1* | .0479 |
| 2 | .0255 |
| 3 | .0301 |
| 4 | .0254 |

*Prior art corrosion inhibitor

TABLE VIII

| Series F | |
|---|---|
| SAMPLE NO. | CORROSION RATE (LB/SQ FT) |
| 1* | .7441 |
| 2 | .6404 |
| 3 | .2309 |
| 4 | .2098 |

*Prior art corrosion inhibitor

TABLE IX

| Series G | |
|---|---|
| SAMPLE NO. | CORROSION RATE (LB/SQ FT) |
| 1* | .1720 |
| 2 | .0765 |
| 3 | .0771 |

TABLE IX-continued

| Series G | |
|---|---|
| SAMPLE NO. | CORROSION RATE (LB/SQ FT) |
| 4 | .0805 |

*Prior art corrosion inhibitor

TABLE X

| Series H | |
|---|---|
| SAMPLE NO. | CORROSION RATE (LB/SQ FT) |
| 1* | .1575 |
| 2 | .2046 |
| 3 | .1476 |
| 4 | .1024 |

*Prior art corrosion inhibitor

TABLE XI

| Series I | |
|---|---|
| SAMPLE NO. | CORROSION RATE (LB/SQ FT) |
| 1* | .0335 |
| 2 | .0276 |
| 3 | .0300 |
| 4 | .0284 |

*Prior art corrosion inhibitor

The above corrosion tests show that the corrosion inhibitor of the present invention is quite effective alone or with additives in providing protection over a wide range of test conditions.

What is claimed is:

1. A method of inhibiting corrosion of ferrous metals which comprises treating a system wherein metals are susceptible to corrosion with a corrosion inhibiting amount of a quaternary compound prepared by reacting a tertiary aromatic heterocyclic amine with a (halo-substituted-aryl) alkyl halide wherein the halogen substitution on the aromatic ring of the (halo-substituted -aryl) alkyl halide does not enter into the reaction and remains intact on said aromatic ring, and the alkyl group contains from 1 to 3 carbon atoms.

2. The method of claim 1 wherein the heterocyclic amine is selected from the group consisting of quinoline, isoquinoline, quinaldine, pyridine, acridine, phenanthridine, and coal tar bases, with or without substituents, and mixtures of the foregoing.

3. The method of claim 1, wherein the quaternary compound has the formula of:

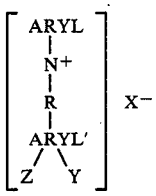

wherein ARYL is a heterocyclic ring or rings; N+ is a positively charged nitrogen atom and is part of ARYL; ARYL' is an aromatic ring or rings; R is an alkyl group containing from 1 to 3 carbon atoms and connects N+ to ARYL'; X is a halogen; Y is a halogen substituted on ARYL'; and Z is a halogen or hydrogen substituted on ARYL'.

4. The method of claim 1 wherein the quaternary compound has a formula selected from the group consisting of

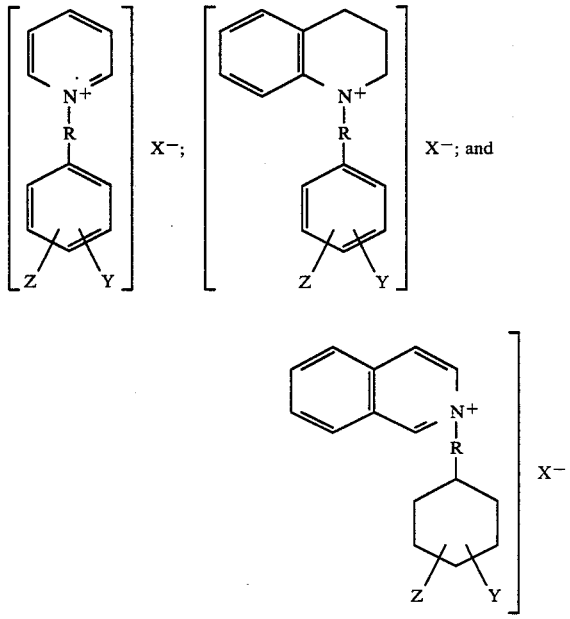

wherein R is an alkyl group containing from 1 to 3 carbon atoms; X and Y are halogens; and Z is a halogen or hydrogen.

5. The method of claim 1 wherein the (halo-substituted-aryl) alkyl halide is halobenzyl halide.

6. A method of acidizing a subterranean formation penetrated by a well having pipe extending from the surface to said formation, which comprises injecting through the pipe and into said formation an aqueous acid solution having dissolved or dispersed therein an acid inhibiting amount of a quaternary compound prepared by the reaction of a tertiary heterocyclic amine with a halogen substituted benzyl halide wherein the substituted halogen is on the aromatic ring and the halide on the benzyl methylene carbon reacts with the amine to form the quaternary compound.

7. The method of claim 6 wherein the halogen substituted benzyl halide is selected from the group consisting of a chlorobenzyl chloride, a fluorobenzyl chloride, bromobenzyl chloride, an iodobenzyl chloride, a chlorotoluene, and a chloromethyl chloronaphthalene.

8. The method of claim 6 wherein the aqueous acid is selected from the group consisting of hydrochloric acid, hydrofluoric acid, acetic acid, formic acid, and mixture of these.

9. The method of claim 8, wherein the quaternary compound comprises from 0.01 to 10.0 vol % of the aqueous acid solution.

10. The method of claim 7 wherein the quaternary compound comprises from 0.05 to 3.0 vol % of the aqueous acid solution.

11. The method of claim 6 wherein the heterocyclic amine is selected from the group consisting of coal tar bases, quinoline, quinaldine, isoquinoline, pyridine, acridene, phenanthradine, and mixtures and substitutions thereof.

12. An inhibited acid comprising (a) an aqueous solution of a well treating acid selected from the group consisting of hydrochloric acid, hydrofluoric acid, acetic acid, formic acid, and mixtures thereof; and (b) from about 0.01 to 10.0 vol % of the treating acid of a quaternary compound prepared by reacting a tertiary aromatic heterocyclic amine with a (halo-substituted-aryl) alkyl halide wherein the halogen substitution is on the aromatic ring and the alkyl halide does not enter into the reaction and remains intact on the aromatic ring and the alkyl group contains from 1 to 3 carbon atoms.

13. The inhibited acid of claim 12 wherein the quaternary compound has the formula consisting of

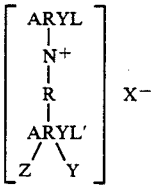

wherein ARYL is a heterocyclic ring or rings; N+ is a positively charged nitrogen atom and is part of ARYL; ARYL' is an aromatic ring or rings; R is an alkyl group containing from 1 to 3 carbon atoms and connects N+ to ARYL'; X is a halogen; Y is a halogen substituted on ARYL'; and Z is a halogen or hydrogen substituted on ARYL'.

14. The inhibited acid of claim 12 and further comprising a water soluble surfactant.

15. The inhibited acid of claim 12, further comprising an effective amount of acetylenic alcohol.

16. The inhibited acid of 12, and further comprising formic acid or formamide.

17. The inhibited acid of claim 12, and further comprising potassium iodide or aqueous iodide.

18. The inhibited acid of claim 12 and further comprising a hydrocarbon liquid.

19. The inhibited acid of claim 12 and further comprising acetylenic alcohol, a hydrocarbon liquid, a water wetting surfactant, and formic acid or formamide.

20. A formulation for inhibiting aqueous acid solutions selected from the group consisting of hydrochloric acid, hydrofluoric acid, acetic acid, formic acid and mixtures thereof which comprises (a) a quaternary compound having the formula

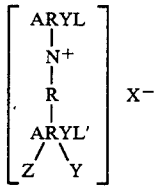

wherein ARYL is a heterocyclic ring or rings; N+ is a positively charged nitrogen atom and is part of ARYL; ARYL' is an aromatic ring or rings; R is an alkyl group containing from 1 to 3 carbon atoms and connects N+ to ARYL'; X is a halogen; Y is a halogen substituted on ARYL'; and Z is a halogen or hydrogen substituted on ARYL'; and (b) an additive selected from the group consisting of acetylenic alcohol, hydrocarbon liquid, water wetting surfactant, formic acid, formamides, and mixtures thereof.

21. A corrosion inhibitor formulation comprising (a) from 5 to 50 wt % of the corrosion inhibitor having the formula of

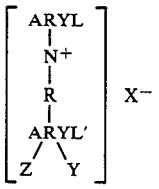

wherein ARYL is a heterocyclic ring or rings; N+ is a positively charged nitrogen atom and is part of ARYL; ARYL' is an aromatic ring or rings; R is an alkyl group containing from 1 to 3 carbon atoms and connects N+ to ARYL'; X is a halogen; Y is a halogen substituted on ARYL'; and Z is a halogen or hydrogen substituted on ARYL'.

(b) from 5 to 25 wt % of acetylenic alcohol;

(c) from 5 to 20 wt % of a hydrocarbon liquid selected from the group consisting of mineral oil, pine oil, aromatic naptha, and $C_{14}$ to $C_{20}$ fatty acids;

(d) from 1 to 10 wt % of a surfactant capable of dispersing the corrosion inhibitor; and (e) from 10 to 50 wt % of formic acid or formamide.

* * * * *